US008670909B2

(12) United States Patent
Perkins et al.

(10) Patent No.: US 8,670,909 B2
(45) Date of Patent: Mar. 11, 2014

(54) AUTOMOTIVE VEHICLE

(75) Inventors: William Paul Perkins, Dearborn, MI (US); Michael Edward Brewer, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 970 days.

(21) Appl. No.: 12/502,248

(22) Filed: Jul. 14, 2009

(65) Prior Publication Data

US 2011/0015844 A1 Jan. 20, 2011

(51) Int. Cl.
*G06F 7/00* (2006.01)
*G06F 17/00* (2006.01)
*G06F 19/00* (2011.01)

(52) U.S. Cl.
USPC ............. 701/69; 701/70; 701/71; 701/72; 180/197; 318/585

(58) Field of Classification Search
USPC ........... 701/62, 69, 70, 71, 72, 73, 74, 80, 81, 701/89; 180/197, 248; 303/143, 190; 318/585, 612
See application file for complete search history.

(56) References Cited

U.S. PATENT DOCUMENTS

| 5,479,348 | A | 12/1995 | Sasaki |
| 6,438,463 | B1 | 8/2002 | Tobaru et al. |
| 6,453,228 | B1 * | 9/2002 | Shimada .......................... 701/89 |
| 6,694,225 | B2 | 2/2004 | Aga et al. |
| 6,704,622 | B2 | 3/2004 | Tinskey et al. |
| 6,945,347 | B2 | 9/2005 | Matsuno |
| 7,040,439 | B2 | 5/2006 | Kowatari et al. |
| 7,107,136 | B2 | 9/2006 | Barta et al. |
| 7,894,955 | B2 * | 2/2011 | Milot ............................... 701/38 |
| 2003/0055549 | A1 * | 3/2003 | Barta et al. ....................... 701/70 |
| 2003/0182041 | A1 * | 9/2003 | Watson ............................ 701/45 |
| 2004/0026151 | A1 * | 2/2004 | Ogata et al. .................... 180/282 |
| 2004/0199317 | A1 * | 10/2004 | Ogata et al. ...................... 701/45 |
| 2005/0114072 | A1 * | 5/2005 | Choi .............................. 702/141 |
| 2006/0066146 | A1 * | 3/2006 | Otomo ............................ 303/151 |
| 2006/0074530 | A1 | 4/2006 | Meyers et al. |
| 2006/0095182 | A1 * | 5/2006 | Lahmann et al. ................ 701/45 |
| 2006/0108161 | A1 | 5/2006 | Feliss et al. |
| 2007/0228822 | A1 * | 10/2007 | Hirata ............................ 303/151 |
| 2009/0192681 | A1 * | 7/2009 | Hayashi et al. .................. 701/45 |

FOREIGN PATENT DOCUMENTS

CN 101045433 A 10/2007

OTHER PUBLICATIONS

Donhgyun Kim, et al.. Rear Motor Control for a 4WD Hybrid Electric Vehicle Stability, D-7803-9435-6/05. ©2005 IEEE, pp. 86-91.

* cited by examiner

*Primary Examiner* — Khoi Tran
*Assistant Examiner* — Jaime Figueroa
(74) *Attorney, Agent, or Firm* — David B. Kelley; Brooks Kushman P.C.

(57) ABSTRACT

An automotive vehicle may include one or more controllers, a braking system and an electric machine. The one or more controllers may be configured to determine whether the vehicle is about to roll over. The braking system may be configured to apply a braking torque for a time period, under the command of the one or more controllers, to a front traction wheel to cause the front traction wheel to skid or slide relative to a road if the vehicle is about to roll over. The electric machine may be configured to generate a propulsion torque, under the command of the one or more controllers, during the time period.

15 Claims, 5 Drawing Sheets

AUTOMOTIVE VEHICLE

BACKGROUND

United States Patent Application Publication US 2006/0074530 to Meyers et al. discloses a system and method for controlling an automotive vehicle. A number of sensors are used to detect a potential roll over condition. In response to the potential roll over condition, active differentials may be used alone or in addition to braking to prevent the vehicle from rolling over.

SUMMARY

An automotive vehicle may include one or more controllers, a braking system and an electric machine. The one or more controllers may be configured to determine whether the vehicle is about to roll over. The braking system may be configured to apply a braking torque for a time period, under the command of the one or more controllers, to a front traction wheel to cause the front traction wheel to skid or slide relative to a road if the vehicle is about to roll over. The electric machine may be configured to generate a propulsion torque, under the command of the one or more controllers, during the time period.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

During a severe vehicle turn maneuver, a lateral roll over may be avoided by applying a braking torque, for a short time (e.g., less than 100 ms), to a front outer tire/wheel assembly. This braking torque may cause the front outer tire to skid or slide thus reducing radial inertial forces on the vehicle. A propulsive torque may be applied to a rear tire/wheel assembly, during the application of the braking torque, to further cause the front outer tire to skid or slide. This propulsive torque may reduce the amount of braking torque necessary to cause the front outer tire to skid or slide, and thus decrease the time between the detection of a potential roll over condition and the initiation of tire skid or slide. This propulsive torque may also, of course, influence the pitch, yaw and/or roll of the vehicle.

A conventional four wheel drive internal combustion engine and driveline (e.g., mechanical linkages such as drive shafts, couplers, etc., between the engine and tire/wheel assemblies), may be used to attempt to perform some of the techniques described above. That is, to avoid a lateral roll over, a braking torque may be applied to a front outer tire/wheel assembly, and engine motive torque generated for delivery to a rear tire/wheel assembly. The response of the engine and driveline (the time required to assess engine and driveline status to determine torque production and delivery capabilities, the time required to create and transmit a torque command to the engine and driveline, and/or the time required by the engine and driveline to produce and deliver the desired torque to the rear tire/wheel assembly) may exceed the duration during which the braking force is applied to the front outer tire/wheel assembly.

Figure 1:
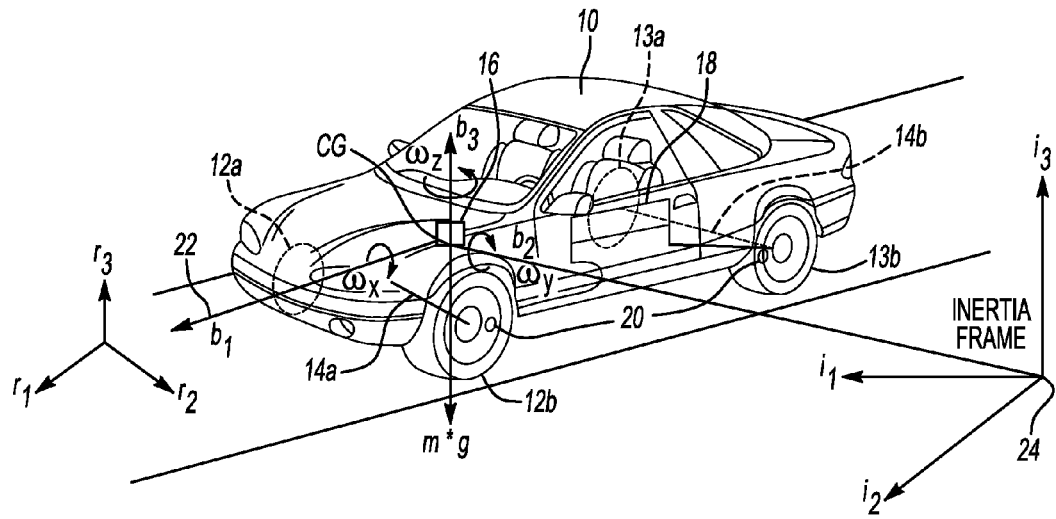
FIG. 1 is a perspective view of an automotive vehicle.

Referring to FIG. 1, an automotive vehicle 10 is illustrated with the various forces and moments thereon during a potential roll over condition. The vehicle 10 has a weight represented as Mg at the center of gravity of the vehicle 10, where g=9.8 m/s² and M is the total mass of the vehicle 10.

The frame $b_1b_2b_3$ may be referred to as a body frame 22, whose origin is located at the center of gravity of the vehicle body, with $b_1$ along the longitudinal direction of the vehicle body (pointing forward), $b_2$ along the lateral direction of the vehicle body (pointing off the driving side, i.e., to the left), and $b_3$ along the vertical direction of the vehicle body (pointing upward). The angular rates of the vehicle body are denoted about the vehicle body's respective axes as $\omega_x$ for the roll rate, $\omega_y$ for the pitch rate, and $\omega_z$ for the yaw rate. Calculations may take place in an inertial frame 24 that may be derived from the body frame 22 as described below.

The road frame system $r_1r_2r_3$ is attached to a driven road surface which is translating and yawing with the vehicle 10, and determined by averaging the four-tire/road contact patches, where $r_3$ is along the average road normal direction computed from the normal directions of the four-tire/road contact patches.

Euler angles of the body frame $b_1b_2b_3$ with respect to the road frame $r_1r_2r_3$ may be denoted as $\theta_{xbr}$ and $\theta_{ybr}$, i.e., relative roll and relative pitch angles, respectively.

The vehicle 10 has front right (FR) and front left (FL) wheel/tires 12a, 12b, and rear right (RR) and rear left (RL) wheel/tires 13a, 13b. The vehicle 10 may also have front steering systems 14a and rear steering systems 14b. For example, each of the front and rear wheels/tires 12a, 12b, 13a, 13b may be independently controlled, both of the front wheels/tires 12a, 12b may be controlled together and both of the rear wheels/tires 13a, 13b may be controlled together, etc.

A sensing system 16 may be coupled to a control system 18. The sensing system 16 may comprise different sensors including, for example, the sensor set typically found in a roll stability control or a roll over control system, e.g., lateral accelerometer, yaw rate sensor, steering angle sensor, and wheel speed sensor, together with a roll rate sensor and a longitudinal accelerometer. The sensors may be used by the control system 18 in various determinations, such as to determine a wheel lifting event, determine a height, position and amount of an added mass, the road surface friction level, the road profiles, the abnormal operation states of the vehicle 10 and its wheels/tires 12a, 12b, 13a, 13b, various motion variables and states of the vehicle 10, etc.

Wheel speed sensors 20 may be mounted at each corner of the vehicle 10, and generate signals corresponding to the rotational speed of each wheel/tire 12a, 12b, 13a, 13b. Other sensors may be mounted directly at the center of gravity of the vehicle body, along the directions x, y and z illustrated in FIG. 1.

The longitudinal acceleration sensor, whose output is denoted as $a_{xd}$, may be mounted on the vehicle body at the center of gravity with its sensing direction along $b_1$. The lateral acceleration sensor, whose output is denoted as $a_y$, may be mounted on the vehicle body at the center of gravity with its sensing direction along $b_2$.

Figure 2:
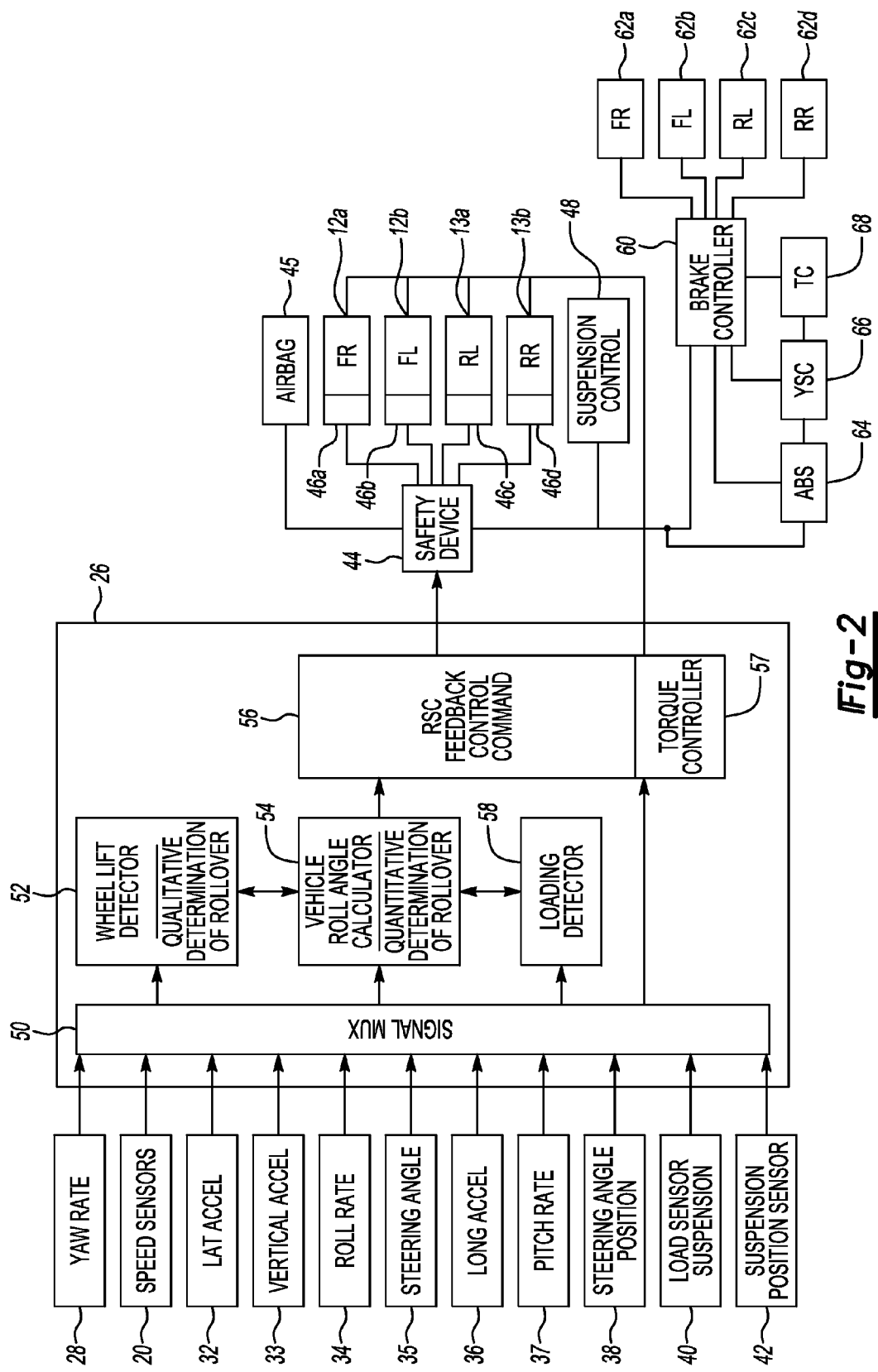
FIG. 2 is a block diagram of an embodiment of an active safety system.

Referring now to FIG. 2, the roll stability control system 18 may have a controller 26 that receives information from a number of sensors which may include the speed sensors 20, a yaw rate sensor 28, a lateral acceleration sensor 32, a vertical accelerometer sensor 33, a roll angular rate sensor 34, a steering wheel angle sensor 35, a longitudinal acceleration sensor 36, a pitch rate sensor 37, a steering angle position sensor 38, a suspension load sensor 40, and a suspension position sensor 42. Of course, various and/or different combinations and sub-combinations of these sensors may be used.

The controller 26 may include a signal multiplexer 50 that receives signals from the sensors 20, 28-42. The signal multiplexer 50 may provide the signals to a wheel lift detector 52, a vehicle roll angle calculator 54, and to a roll stability control (RSC) feedback control command 56. The vehicle roll angle calculator 54 may be coupled to the wheel lift detector 52 and RSC feedback command 56. The RSC feedback command 56 may include a torque controller 57. A loading detector 58 may also be included in the controller 26. The loading detector 58 may be used to determine an additional mass of the vehicle 10 and a distance of the mass as will be described below.

In certain embodiments, the sensors 28-42 are located at the center of gravity of the vehicle 10. Those skilled in the art will recognize, however, that the sensors 28-42 may also be located away from the center of gravity and translated equivalently thereto.

Based upon inputs from some or all of the sensors 28-42, the controller 26 may control a safety device 44. The safety device 44 may control an airbag 45 or a steering actuator 46A-46D at one or more of the wheels/tires 12a, 12b, 13a, 13b. Also, other vehicle components such as a suspension control 48 may be used to adjust the suspension during a potential roll over event to help reduce initial roll trending of the vehicle 10, to reduce the over-steer characteristics of the vehicle 10, and to work with the roll stability control so as to achieve a smooth and non-intrusive roll over prevention.

The roll angular rate sensor 34 and pitch rate sensor 37 may sense the roll condition or lifting of the vehicle 10 based on sensing the height of one or more points on the vehicle 10 relative to the road surface. Sensors that may be used to achieve this include, but are not limited to, a radar-based proximity sensor, a laser-based proximity sensor, and a sonar-based proximity sensor. The roll rate sensor 34 may also use a combination of sensors, such as proximity sensors, to make a roll rate determination.

The roll rate sensor 34 and pitch rate sensor 37 may also sense the roll condition or wheel lifting condition based on sensing the linear or rotational relative displacement or displacement velocity of one or more of the suspension chassis components. This may be in addition to or in combination with the suspension position sensor 42. The roll rate sensor 34, pitch rate sensor 37, and/or position sensor 42 may include a linear height or travel sensor, a rotary height or travel sensor, a wheel speed sensor used to detect changes in velocity, a steering wheel position sensor, a steering wheel velocity sensor, and a driver heading command input from an electronic component that may include steer by wire using a hand wheel or joy stick.

The roll condition or wheel lifting condition may also be detected by sensing directly or estimating the force or torque associated with the loading condition of one or more suspension or chassis components including a pressure transducer in an act of air suspension, a shock absorber sensor such as the load sensor 40, a strain gauge, the steering system absolute or relative motor load, the steering system pressure of the hydraulic lines, a tire lateral force sensor or sensors, a longitudinal tire force sensor, a vertical tire force sensor, or a tire sidewall torsion sensor. The yaw rate sensor 28, roll rate sensor 34, lateral acceleration sensor 32, and longitudinal acceleration sensor 36 may be used together to determine that the wheel has lifted. Such sensors may be used to determine wheel lift or estimate normal loading associated with wheel lift.

The roll condition of the vehicle 10 may also be established by one or more of the following translational or rotational positions, velocities or accelerations of the vehicle 10 including a roll gyro, the yaw rate sensor 28, lateral acceleration sensor 32, vertical acceleration sensor 33, roll rate sensor 34, vehicle longitudinal acceleration sensor 36, lateral or vertical speed sensor (including the wheel-based speed sensors 20), a radar-based speed sensor, a sonar-based speed sensor, a laser-based speed sensor, or an optical-based speed sensor.

The safety device 44 may control the position of the front right wheel actuator 46A, front left wheel actuator 46B, rear left wheel actuator 46C, and right rear wheel actuator 46D. Two or more of the actuators 46A, 46B, 46C, 46D may be simultaneously controlled. For example, in a rack-and-pinion system, the two wheels coupled thereto are simultaneously controlled. Based on the inputs from some or all of the sensors 28-42, the controller 26 may determine a roll condition and/or wheel lift, and control the steering position and/or braking of the wheels.

The safety device 44 may be coupled to a brake controller 60. The brake controller 60 may control the amount of brake torque at a front right brake 62a, front left brake 62b, rear left brake 62c, and rear right brake 62d. Other safety systems such as an antilock brake system 64, a yaw stability control system 66, and a traction control system 68 may also benefit from the knowledge of the roll gradient, roll rate parameter, roll acceleration coefficient, and additional mass and position of the mass. This information may influence the control strategy by modifying the amount of braking.

The speed sensors 20 may be one of a variety of speed sensors known to those skilled in the art. For example, a suitable speed sensor may include a sensor at every wheel/tire 12a, 12b, 13a, 13b that is averaged by the controller 26. The controller 26 may translate the wheel speeds into the speed of the vehicle 10. Yaw rate, steering angle, wheel speed, and possibly a slip angle estimate at each wheel/tire 12a, 12b, 13a, 13b may be translated back to the speed of the vehicle 10 at the center of gravity. Various other algorithms are known to those skilled in the art. Speed may also be obtained from a transmission sensor. For example, if speed is determined while speeding up or braking around a corner, the lowest or highest wheel speed may not be used because of its error.

The load sensor 40 may be a load cell coupled to one or more suspension components. By measuring the stress, strain or weight on the load sensor 40, a shifting of the load can be determined.

The roll condition of a vehicle may be characterized by the relative roll angle between the vehicle body and the wheel axle and the wheel departure angle (between the wheel axle and the average road surface). Both the relative roll angle and the wheel departure angle may be calculated in a relative roll angle estimation module by using the roll rate and lateral acceleration sensor signals, or other sensor signals. If both the relative roll angle and the wheel departure angles are large enough, the vehicle 10 may be in either single wheel lifting or double wheel lifting. On the other hand, if the magnitude of both angles is small, the wheels/tires 12a, 12b, 13a, 13b are likely grounded. In the case that both are not small, and the double wheel lifting condition is detected or determined, the sum of those two angles may be used by the feedback control module 56 to compute the desired actuation command for achieving roll stability control performance.

The roll condition of the vehicle 10 may be characterized by the rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angles may assume abnormal values when there are large wheel slips. This happens when a wheel is lifted and there is torque applied to the wheel. Therefore, if this rolling radius-based wheel departure angle is increasing rapidly, the vehicle 10 may have lifted wheels. A small magnitude of this angle indicates the wheels/tires 12a, 12b, 13a, 13b are all grounded.

The roll condition of the vehicle 10 may be detected indirectly from the wheel longitudinal slip. If during normal braking or driving torque, the wheels/tires at one side of the vehicle 10 experience increased magnitude of slip, then these wheels/tire are losing longitudinal road torque. This implies that these wheels/tires are either driven on a low mu surface or lifted up. The low mu surface condition and wheel-lifted-up condition may be further differentiated based on the chassis roll angle computation, i.e., on a low mu surface, the chassis roll angle is usually small.

The roll condition of the vehicle 10 may be characterized by the normal loading sustained at each wheel/tire 12a, 12b, 13a, 13b. Theoretically, when a normal loading at a wheel/tire decreases to zero, that wheel/tire is no longer contacting the road surface. In this case, a potential roll over is underway. A large magnitude of this loading indicates that the wheel/tire is grounded. Normal loading is a function of the calculated chassis or relative roll and pitch angles.

The roll condition of the vehicle 10 may be detected by checking the actual road torques applied to the wheels/tires 12a, 12b, 13a, 13b and the road torques, which are needed to sustain the wheels/tires 12a, 12b, 13a, 13b when they are grounded. The actual road torques may be obtained through torque balancing for each wheel/tire using wheel acceleration, driving torque and braking torque. If a wheel/tire is contacting the road surface, the calculated actual road torques must match or be larger than the torques determined from the nonlinear torques calculated from the normal loading and the longitudinal slip at each wheel/tire.

The roll condition of the vehicle 10 may be characterized by the chassis roll angle itself, i.e., the relative roll angle $\theta_{xr}$ between the vehicle body and the wheel axle. If this chassis roll angle is increasing rapidly, the vehicle 10 may be on the edge of wheel lifting or roll over. A small magnitude of this angle indicates the wheels/tires 12a, 12b, 13a, 13b are not lifted or are all grounded.

The roll condition of the vehicle 10 may also be characterized by the roll angle between the wheel axle and the average road surface, (referred to as wheel departure angle). If the roll angle is increasing rapidly, the vehicle 10 has a lifted wheel/tire (or wheels/tires) and aggressive control action needs to be taken in order to prevent the vehicle 10 from rolling over. A small magnitude of this angle indicates that the wheels/tires 12a, 12b, 13a, 13b are not lifted.

Figure 3:
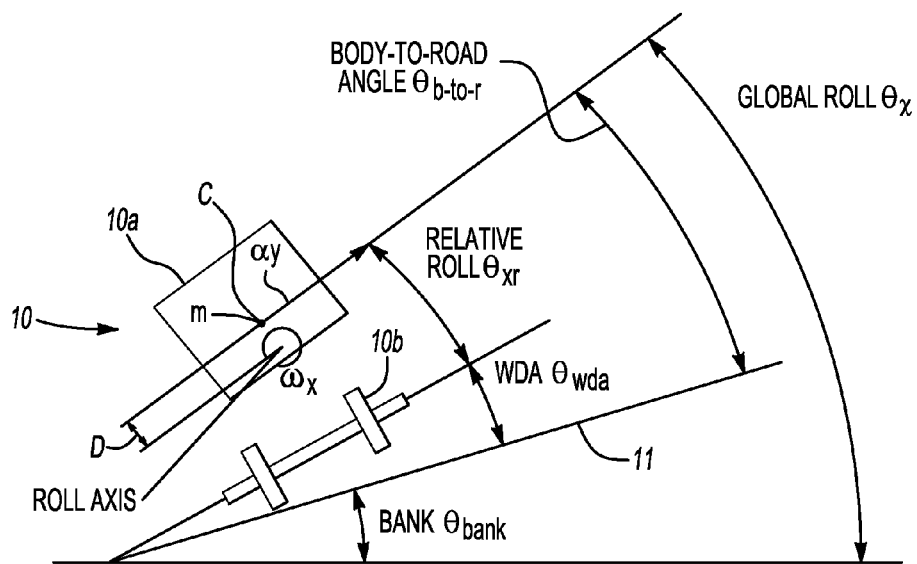
FIG. 3 is a front schematic view of the vehicle of FIG. 1.

Referring now to FIG. 3, the relationship of the various angles of the vehicle 10 relative to a road surface 11 is illustrated. In the following, a reference road bank angle $\theta_{bank}$ is shown relative to the vehicle 10 on the road surface 11. The vehicle 10 has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a. The linear bank angle may be calculated by subtracting the relative roll angle generated from the linear roll dynamics of the vehicle 10. If all things were slowly changing without drifts, errors or the like, the linear bank angle and reference road bank angle terms would be equivalent. The center of gravity C is illustrated with nominal mass m. A roll axis is also illustrated at a distance D from the center of gravity. $a_y$ is the lateral acceleration.

Figure 4:
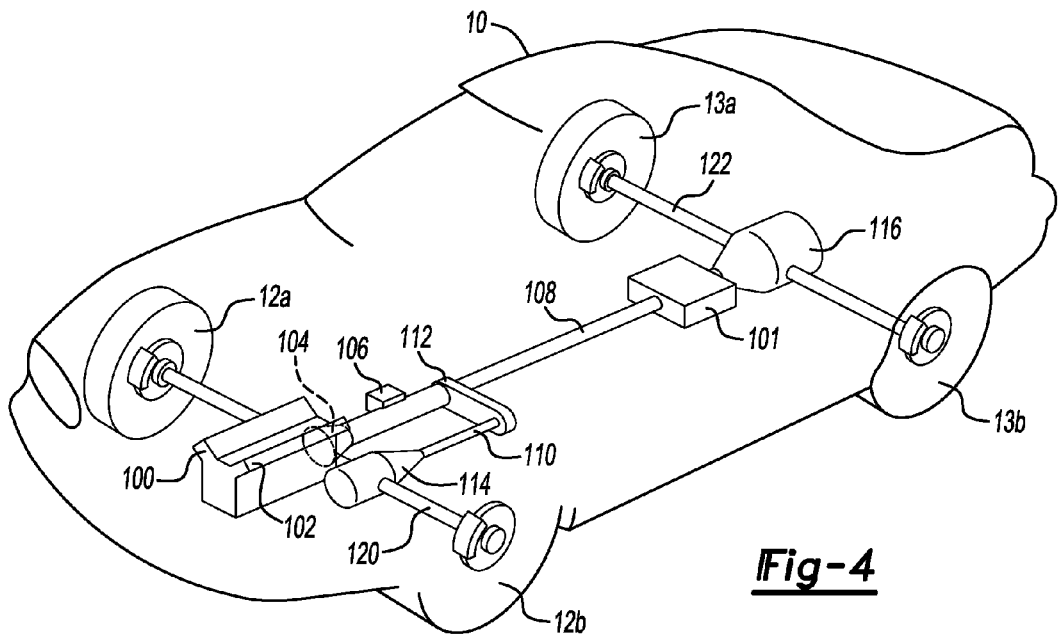
FIG. 4 is another perspective view of the vehicle of FIG. 1.

Referring now to FIG. 4, an example configuration of the vehicle 10 is illustrated in further detail. The vehicle 10 has an internal combustion engine 100 and electric machine 101. The engine 100 may have a throttle device 102 coupled thereto. The throttle device 102 is actuated by a foot pedal not shown. The throttle device 102 may be part of a drive-by-wire system or a direct mechanical linkage with the pedal. The throttle device 102 may generate an output signal that provides indication as to a low throttle opening or a large throttle opening. As those skilled in the art will recognize, throttle position sensors generate an output signal corresponding to the amount that the throttle is open. A similar result may be obtained by providing a sensor on the accelerator pedal if a direct linkage is used rather than a drive-by-wire system.

A transmission 104 may be coupled to the engine 100. The transmission 104 may be an automatic, continuously variable or manual transmission. A gear selector (not shown) may be used to select the various gears of the transmission 104. A transmission controller 106 may be coupled thereto. The transmission controller 106 may be a separate component or integrated with an engine controller, or another controller. The output of the transmission 104 is coupled to a rear driveshaft 108 and a front driveshaft 110 through a transfer case 112. The transfer case 112 may include a center differential. The transfer case 112 may include an active center differential.

A front differential 114 may be coupled with the front driveshaft 110 and a front axle 120. The front differential 114 may transfer torque between the front driveshaft 110 and a front axle 120. A rear differential 116 may be coupled with the electric machine 101 and a rear axle 122. The rear differential 116 may transfer torque between the rear drive shaft 108 and/or electric machine 101 and the rear axle. Both the front differential 114 and rear differential 116 may be referred to as an axle differential. The front differential 114 and rear differential 116 may be active axle differentials (e.g., a differential whose torque-delivery and/or biasing is electronically controlled by an actuator). The transfer case 112, front differential 114, and/or rear differential 116 may be electronically controlled in conjunction with various dynamic control systems, engine control systems, and transmission control systems.

In alternative configurations, the vehicle 10 may lack, for example, the rear drive shaft 108. In such configurations, the engine 100 may drive the front wheels/tires 12a, 12b, and the electric machine 101 may drive the rear wheels/tires 13a, 13b. Other configurations are, of course, also possible.

The electric machine 101, in the embodiment of FIG. 4, is mechanically connected with the tires/wheels 13a, 13b such that a speed ratio of the electric machine 101 to the tires/wheels 13n is generally fixed. As used herein, "generally fixed" means: not disengageable, unless the disengagement/engagement is faster than the electric machine's time required to produce the desired torque; not speed-variable, unless the desired speed ratio between the electric machine 101 and tire/wheel 13n can be achieved faster than electric machine's ability to generate torque; not significantly inhibited by lash (e.g., the time required to overcome the lash is small compared to the time required for the electric machine 101 to produce the desired torque (e.g., lash fill time<5× production time)); not significantly impeded by driveline compliance (e.g., the time difference between the electric machine 101 reaching the desired torque production and the delivery of that torque to the tire/wheel 13n is small compared to the time required for the electric machine 101 to produce the desired torque (e.g., wind-up time<5× production time)).

As known in the art, "lash" is looseness or gap(s) in driveline torque-transfer mechanisms that must first be overcome/filled before full torque can be transmitted. Lash may be caused by play in transmission splines, transmission gearing, gear shimming, bushing wear, compliance, and other factors. As also known in the art, "compliance" and "wind-up" describes the spring-like behavior of torque-transfer mechanisms. Upon torque application, a shaft will twist in response inline with Hooke's law: T=k*angle. Each torque-carrying element must first comply in proportion to the torque applied before it can convey the full upstream torque onto the next torque-carrying element. Excessive compliance may delay torque delivery to the tires/wheels 12n, 13n.

Torque production of certain electric machines may be limited, for example, to 2000 Nm/s; this may be done to prevent torque spikes that may damage shafts/driveline. For a rear axle motor that produces 200 Nm max, the time to full torque can occur in 100 ms—about five to ten times faster than typical engine torque production and delivery. Also, for ABS events, certain motors may remove torque at a rate of, for example, 6000 Nm/s. Thus, a motor producing max 200 Nm of torque may remove it (when commanded) within approximately 35 ms, or approximately half the time required for a typical brake system to produce a brake-torque pulse at a wheel. These production and removal times may make the electric machine better suited for rapid torque coordination with the brake system during stability events.

In the following description, inside and outside wheels refer to the direction of the wheels in a turn. Thus, if the vehicle 10 is turning left, the wheels/tires 12a and 13a are on the outside and the wheels/tires 12b and 13b are on the inside of the turn.

Figure 5:
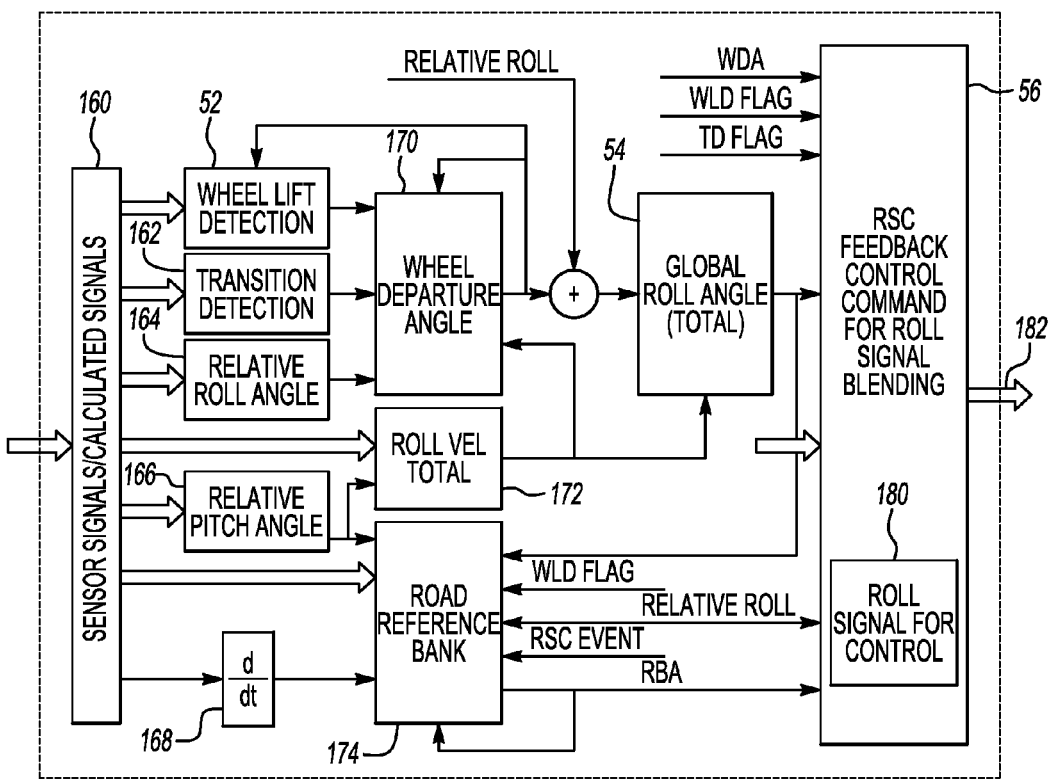
FIG. 5 is a block diagram of an embodiment of a roll stability controller.

Referring now to FIG. 5, the controller 26 is illustrated in further detail. The controller 26 receives signals from the sensors 20, 28, 32, 34, 35, 36, 37 at a multiplexer 160, and integrates all the sensor signals with the calculated signals to generate signals suitable for roll stability control algorithms as known in the art. From the various sensor signals, wheel lift detection may be determined by the wheel lift detector 52. Wheel lift detector 52 includes both active wheel lift detection and passive wheel lift detection, and wheel grounding condition detection. (The modules described herein may be implemented in hardware or software in a general purpose computer (microprocessor)). From the wheel lift detection module 52, a determination of whether each wheel is absolutely grounded, possibly grounded, possibly lifted, or absolutely lifted may be determined. A transition detection module 162 is used to detect whether the vehicle 10 is experiencing aggressive maneuvering due to sudden steering wheel inputs from the driver. Some or all of the sensors 28-42 may also be used to determine a relative roll angle in relative roll angle module 164. Relative roll angle may be determined in many known ways. For example, a roll acceleration module 168 may be used in conjunction with the lateral acceleration sensor 32. As described above, the relative roll angle may be determined from the roll conditions described above.

The various sensor signals may also be used to determine a relative pitch angle in relative pitch angle module 166, and a roll acceleration in roll acceleration module 168. The outputs of the wheel lift detection module 52, the transition detection module 162, and the relative roll angle module 164 may be used to determine a wheel departure angle in wheel departure angle module 170. Various sensor signals and the relative pitch angle in relative pitch angle module 166 may be used to determine a relative velocity total in module 172. A road reference bank angle block 174 determines the bank angle. The relative pitch angle, the roll acceleration, and various other sensor signals as described herein may be used to determine the road reference bank angle. Other inputs may include a roll stability control event (RSC) and/or the presence of a recent yaw stability control event, and the wheel lifting and/or grounding flags.

The global roll angle of the vehicle 10 may be determined in global roll angle module 54. The relative roll angle, the wheel departure angle, and the roll velocity total blocks are all inputs to the global roll angle total module 54. The global roll angle total block determines the global roll angle $\theta_x$. The RSC feedback control module 56 receives the global roll angle total module 54 and the road reference bank angle from the road reference bank angle module 174. A roll signal for control is developed in roll signal module 180. The roll signal for control is illustrated as arrow 182.

In the reference road bank angle module 174, the reference bank angle estimate is calculated. The objective of the reference bank estimate is to track a robust but rough indication of the road bank angle experienced during driving in both stable and highly dynamic situations, and which is in favor for roll stability control. That is, this reference bank angle is adjusted based on the vehicle driving condition and the vehicle roll condition. When compared to the global roll estimate, it is intended to capture the occurrence and physical magnitude of a divergent roll condition (two wheel lift) should it occur. This signal is intended to be used as a comparator against the global roll estimate for calculating the error signal, which is fed back to the roll stability controller 26.

Figure 6:
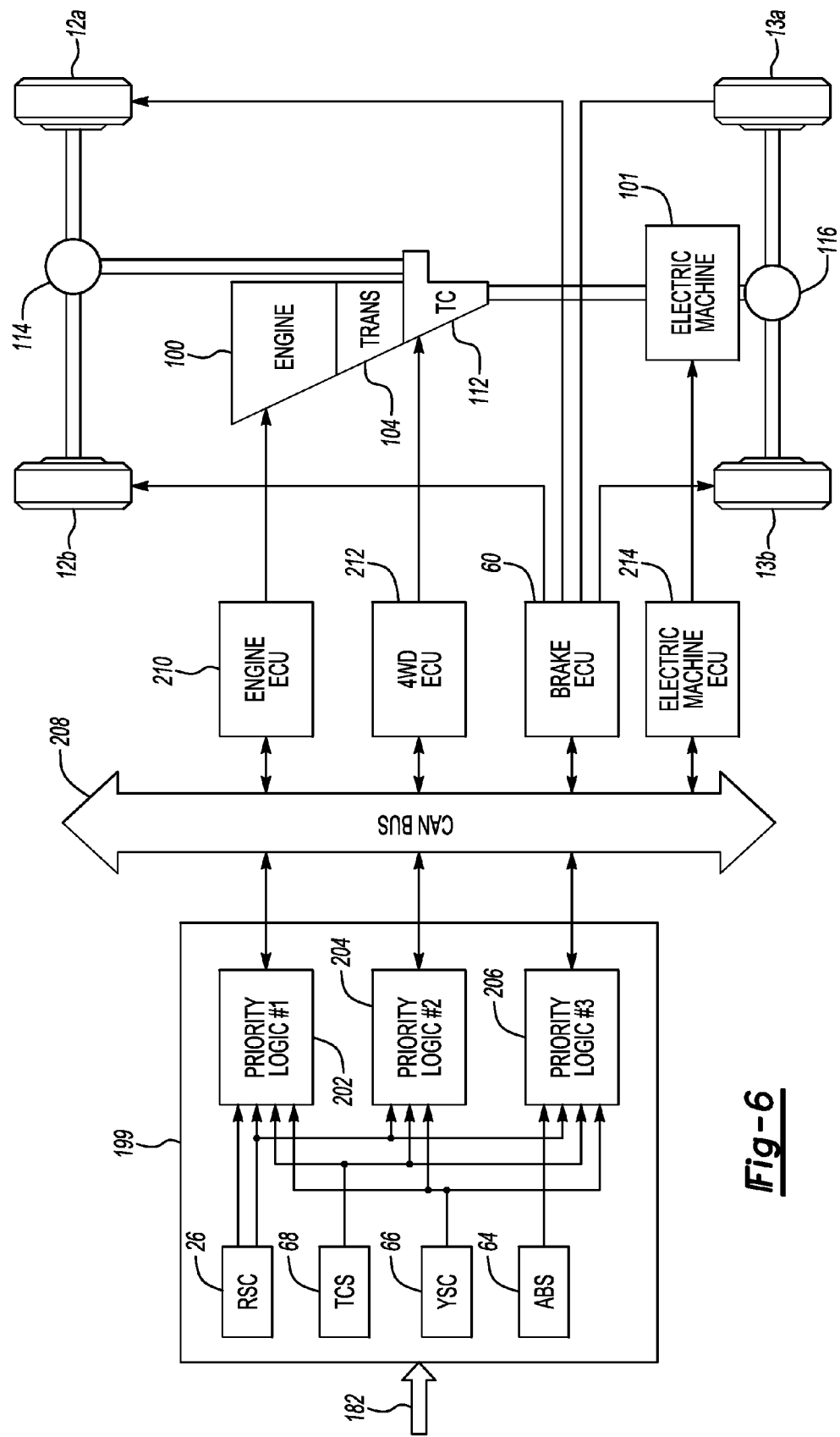
FIG. 6 is a block diagram of an embodiment of a roll stability control system.

Referring now to FIG. 6, the sensor signals and the calculated signals from the sensor signals (such as the roll signal for control 182) are fed into an integrated control unit 199. The calculated signals may be provided to the various dynamic control algorithm units in which feedback and/or feedforward control signals or control commands are calculated based on the available signals to achieve various control functions. Those control algorithm units may include the roll stability controller 26, the traction control system 68, the yaw stability control system 66, and the anti-lock brake system 64.

The outputs of the various control algorithm units may generate the control commands for achieving specific control functions and those control commands are ready to activate the specific actuator hardware. Due to potential conflicts, the individual control command may command the specific actuator in a different manner. For example, the roll stability control may request the front outside brake to increase its pressure level while the ABS control may request the same actuator to either hold or damp its brake pressure. Therefore, it may be necessary to arbitrate or prioritize the multiple control requests being sent to the same actuator.

Such arbitration or priority logics may be conducted in a first priority logic 202, second priority logic 204, and third priority logic 206. The priority logics 202, 204 and 206 generate the final/arbitrated/prioritized control commands for an engine ECU 210, 4WD ECU 212, electric machine ECU 214, and the brake ECU 60, respectively. As an example, TCS, RSC and YSC might request engine torque reduction simultaneously, the maximum rule may be used in priority logic 202 to calculate torque reduction sent to the engine ECU 210. As another example, TCS, ABS, RSC and YSC may all request brake pressure at one brake. In this case, the maximum rule may be used in priority logic 206. Some of the functions, however, may request pressure drop (ABS for example), and some of the functions may request pressure increase at the same brake location. In this case, a more sophisticated brake pressure priority or arbitration logic may be conducted in priority logic 206. The priority logics may be provided to a vehicle controller area network (CAN) bus 208.

In some embodiments, the above priority logic group may only touch cases where multiple control commands are requesting actuations for the same actuator. Another priority logic group may be conducted where a specific control command for a specific control function is sent to multiple actuators. For example, the RSC feedback control command may be sent to the engine ECU 210 for engine torque reduction, to the 4WD ECU 212 for front and rear torque distribution, to the brake ECU 60 for brake torque in the front outside wheel and to suspension for roll stiffness distribution, etc. In those cases, more sophisticated coordination may be conducted based on vehicle motion variables.

Figure 7:
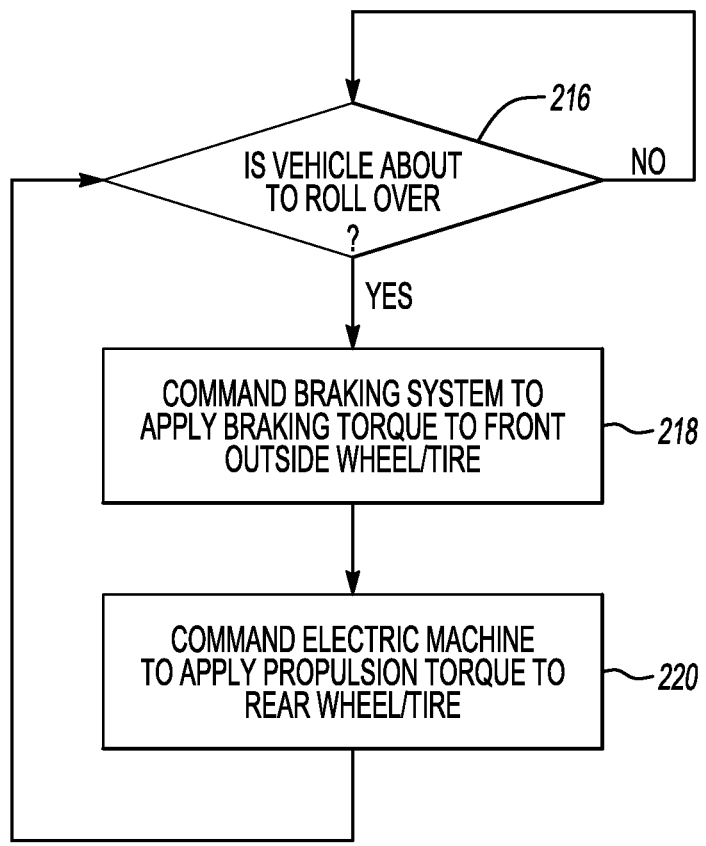
FIG. 7 is a flow chart depicting an example roll stability control algorithm.

Referring now to FIGS. 6 and 7, it is determined whether the vehicle is about to roll over as indicated at 216. For example, during a left cornering maneuver, the integrated control unit 199, as described above, may determine whether the inside wheels/tires 12b, 13b are about to lift off of the road. If yes, a braking torque may be applied to the front outside wheel/tire to cause that tire to skid or slide on the road as indicated at 218. For example, the integrated control unit 199 may issue a command to the brake ECU 60 to apply a braking torque to the wheel/tire 12a for 100 ms. As indicated at 220, a propulsion torque may be applied to a rear wheel/tire during the application of the braking torque to the front wheel/tire. For example, the integrated control unit 199 may issue a command to the electric machine ECU 214 to apply (and subsequently remove) a propulsion torque to the wheel/tire 13a while the braking torque is being applied to the wheel/tire 12a.

The proximity of the electric machine 101 relative to the wheels/tires 13a, 13b, and the ability of the electric machine 101 to more quickly generate torque (relative to the response time of the engine and driveline) allows a propulsion torque to be applied (and removed) to the rear wheel/tire 13a while the braking torque is being applied to the front wheel/tire 12a.

In other embodiments, the integrated control unit 199, for example, may be configured, in a known fashion, for early indication/detection that a roll event may ensue. That is, the integrated control unit 199 may determine whether the appropriate vehicle parameters are on a trajectory that will result in the eventual lift off of at least one of the inside wheels/tires 12b, 13b. If so, the integrated control unit 199 may issue a command to the electric machine ECU 214 to generate a torque so as to overcome any lash and/or compliance in the system prior to application of the braking torque discussed above. This may further improve the overall performance of the system because the propulsion torque described above may be applied more rapidly.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An automotive vehicle having a front and rear traction wheel, the vehicle comprising:
    one or more controllers programmed to detect when the vehicle is about to roll over;
    a braking system configured to apply a braking torque for a time period, under the command of the one or more controllers, to the front fraction wheel to cause the front traction wheel to skid or slide relative to a road if the vehicle is about to roll over;
    an electric machine configured to generate a propulsion torque, under the command of the one or more controllers, during the time period; and
    a mechanical linkage from the electric machine to the rear traction wheel, the linkage configured to transmit and apply the propulsion torque from the electric machine to the rear traction wheel before the end of the time period.

2. The vehicle of claim 1 wherein the electric machine is further configured to stop generating the propulsion torque, under the command of the one or more controllers, before the end of the time period.

3. The vehicle of claim 2 wherein the linkage is further configured to stop applying the propulsion torque (i) after the electric machine stops generating the propulsion torque and (ii) before the end of the time period.

4. The vehicle of claim 1 further comprising an internal combustion engine and driveline configured to produce and deliver torque to at least one of the front and rear traction wheels, wherein the time period is less than a response time of the engine and driveline for a given amount of torque.

5. The vehicle of claim 1 wherein the time period is less than 1000 milliseconds.

6. The vehicle of claim 1 wherein the time period is less than 100 milliseconds.

7. An automotive vehicle having a front and rear traction wheel, the vehicle comprising:
    one or more controllers programmed to detect when the vehicle is about to roll over;
    a braking system configured to apply a braking torque, under the command of the one or more controllers, to the front traction wheel to cause the front traction wheel to skid or slide relative to a road if the vehicle is about to roll over; and
    an electric machine (i) mechanically connected with the rear traction wheel such that a speed ratio of the electric machine to the rear traction wheel is generally fixed and (ii) configured to apply a propulsion torque, under the command of the one or more controllers, to the rear traction wheel to at least one of modify and maintain at least one of a pitch, yaw and roll of the vehicle if the vehicle is about to roll over.

8. The vehicle of claim 7 wherein the braking system is further configured to apply the braking torque for a time period and wherein the electric machine is further configured to apply and subsequently remove the propulsion torque during the time period.

9. The vehicle of claim 8 wherein the time period is less than 1000 milliseconds.

10. The vehicle of claim 8 wherein the time period is less than 100 milliseconds.

11. The vehicle of claim 8 further comprising an internal combustion engine and driveline configured to produce and deliver torque to at least one of the front and rear traction wheels, wherein the time period is less than a response time of the engine and driveline for a given amount of torque.

12. An automotive vehicle having a front and rear traction wheel, the vehicle comprising:

an internal combustion engine and driveline configured to produce and deliver torque to at least one of the front and rear traction wheels;

one or more controllers configured to detect when the vehicle is about to roll over;

a braking system configured to apply a braking torque for a time period, under the command of the one or more controllers, to the front traction wheel to cause the front fraction wheel to skid or slide relative to a road if the vehicle is about to roll over, wherein the time period is less than a response time of the engine and driveline for a given amount of torque;

an electric machine configured to generate a propulsion torque, under the command of the one or more controllers, during the time period; and a mechanical linkage from the electric machine to the rear traction wheel, the linkage configured to transmit and apply the propulsion torque from the electric machine to the rear traction wheel before the end of the time period.

13. The vehicle of claim 12 wherein the electric machine is further configured to generate another propulsion torque prior to the time period, under the command of the one or more controllers, to overcome at least one of lash and compliance in the mechanical linkage.

14. The vehicle of claim 12 wherein the time period is less than 1000 milliseconds.

15. The vehicle of claim 12 wherein the time period is less than 100 milliseconds.

* * * * *